United States Patent [19]

Hilsenbeck

[11] Patent Number: 4,745,665

[45] Date of Patent: May 24, 1988

[54] ELONGATED CLIPS HAVING A METAL CORE AND METAL CORE FOR SUCH CLIPS

[76] Inventor: Henry K. Hilsenbeck, 17813 Suncliff Pl., Strongsville, Ohio 44136

[21] Appl. No.: 32,758

[22] Filed: Mar. 30, 1987

[51] Int. Cl.⁴ .......................... E04F 19/02; E06B 7/16
[52] U.S. Cl. ........................................ 24/295; 49/491
[58] Field of Search ............ 24/295, 129 B, 563; 49/491, 440, 441, 497

[56] References Cited

U.S. PATENT DOCUMENTS

| | | | |
|---|---|---|---|
| 2,554,452 | 5/1951 | Bright | 49/491 |
| 2,986,793 | 6/1961 | Bright | 24/295 |
| 3,238,583 | 3/1966 | Bright | 49/491 |
| 3,256,577 | 2/1965 | Bright . | |
| 4,271,634 | 6/1981 | Andrzejewski | 49/441 |
| 4,477,507 | 10/1984 | Kunert | 49/491 |

FOREIGN PATENT DOCUMENTS

| | | | |
|---|---|---|---|
| 1076933 | 3/1960 | Fed. Rep. of Germany | 49/491 |
| 2302877 | 8/1973 | Fed. Rep. of Germany . | |
| 2834842 | 2/1979 | Fed. Rep. of Germany . | |
| 1377376 | 9/1964 | France | 24/295 |
| 1519307 | 3/1968 | France | 49/491 |
| 708245 | 5/1954 | United Kingdom | 49/491 |
| 1095178 | 12/1967 | United Kingdom | 49/491 |

*Primary Examiner*—Victor N. Sakran
*Attorney, Agent, or Firm*—Renner, Otto, Boisselle & Lyon

[57] ABSTRACT

A core for making elongate flexible clips having a plastic covering is a length of a flexible metal ribbon having transversely disposed slits cut into the edges of the ribbon. The ribbon includes a generally longitudinal carrier. The slits on opposite sides of the ribbon are longitudinally offset from each other. The core is covered with a plastic material. Thereafter the covered core is bent along one or more axes lying along the length of the core to form a clip. Because of the structure of the core, the clip may be extended longitudinally by tensile forces and resist longitudinal shrinkage in response to the compressive forces applied by the plastic covering.

12 Claims, 2 Drawing Sheets

ELONGATED CLIPS HAVING A METAL CORE AND METAL CORE FOR SUCH CLIPS

BACKGROUND

This invention relates to elongated, flexible clips having a plastic covering on a metal core. Such clips are used for appearance and to form seals along a flange formed at an edge of an object. A common application of such clips is in vehicles, such as automobiles, boats and motorcycles, where the clips are disposed along doors, windows and other elements including openings or edges.

Clips of the type related to the invention include a metal core that gives the clip strength, and at least some of its shape and its gripping capacity, while retaining flexibility. The metal core is coated with a plastic material, i.e., a material that is flexible such as a synthetic rubber or a plastic, that has an aesthetically acceptable surface and that is pliable so that a fluid-tight seal can be formed with another object. Generally, the metal core is formed into a U-shape or a similar shape that includes a narrowed throat and larger enclosure. A prepared flange on an object, such as an automobile door edge, is inserted into the throat of the clip. The metal core of the clip permits deflection of the clip legs while the flange is being inserted into the clip throat. Once the flange is in place, the deflected legs of the metal core exert clamping forces that secure the clip to the flange.

Clips of the type just described are manufactured in very long, continuous lengths. In order to use the clip material efficiently in manufacturing, the continuous lengths are severed into selected lengths. For example, in automobile manufacturing, a supplier provides lengths of clip material cut to the manufacturer,s specifications. Because of normal variations in the cut lengths of the clips and in the dimensions of the parts to which the clips are applied, a clip length may occasionally be slightly shorter than desired. In this situation, a gap will be left between one or both of the ends of the clip and the surface or surfaces those ends are intended to abut. In order to avoid the undesired appearance given by a too-short clip, some clips, depending on the construction of their metal cores, may be stretched to the desired length by applying tensile forces. However, in known clips, the outer covering, particularly if it is a plastic, exerts restorative, compressive forces on a stretchable clip that has been extended. These forces will, over time, shrink the clip toward its original length. That is, the undesired gap or gaps produced by a shortened clip that may be stretched are only temporarily avoided by the stretching and eventually reappear.

Accordingly, it would be desirable to provide a clip of the type described that could be slightly stretched by applying tensile forces, that would not lose its flexibility in the stretching and that would resist subsequent shrinkage.

SUMMARY OF THE INVENTION

In the invention, a novel metal core for a clip and a clip incorporating the metal core are provided. The metal ribbon core has opposed edges along its length and a generally lengthwise carrier disposed between, generally parallel to, and spaced from, those edges. Transverse slits are cut through the ribbon from each edge toward the carrier. According to the invention, the slits along one edge of the ribbon are longitudinally offset with respect to the slits extending from the opposite edge of the ribbon. Preferably, the slits along each edge of the ribbon are uniformly spaced from each other. In that arrangement, it is preferred that each slit on one edge of a ribbon is disposed substantially equidistant from the two closest slits along the opposite edge of the ribbon.

A metal core according to the invention is manufactured by slitting the metal ribbon and applying a force or forces to the ribbon in order to open the slits into slots. The core is coated with a plastic material to produce the desired finished appearance. The covered metal core is bent as desired along axes generally parallel to the length of the ribbon to form a U-shape or other desired shape clip. The resulting clip is flexible and can conform to relatively small radius corners because of the slots along the length of the clip. Each pair of slots along an edge of the core ribbon defines, between the slots, a prong. Because of the offset relation of slots along opposed edges of the ribbon, the bridges between prongs on opposite sides of the carrier are oblique, rather than transverse, to the carrier. As a result of this configuration, a novel clip incorporating the novel core may be stretched by working the metal along the bridges. After the working there is no loss of flexibility of the clip and the worked metal prevents shrinkage of the clip to its original length.

DETAILED DESCRIPTION OF PREFERRED EMBODIMENTS

Figure 1:
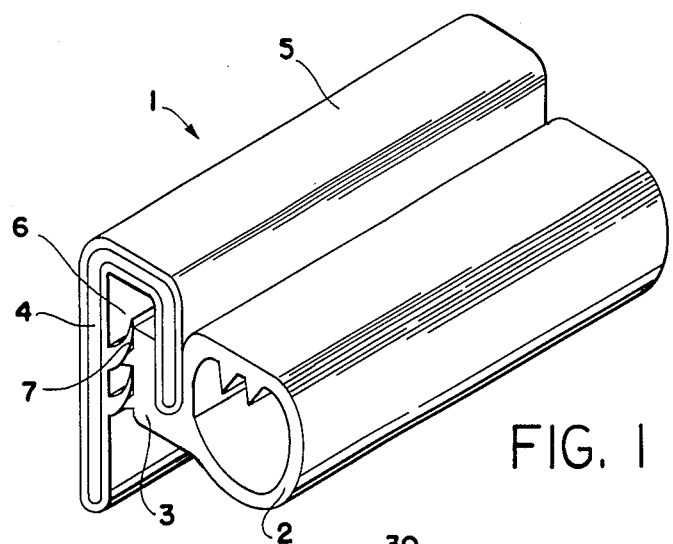
FIG. 1 is a perspective view of a clip.

In FIG. 1 a perspective view of a length of an elongated clip 1 is shown. Clip 1 is shown engaging a tubular gasket material 2 having a depending flange 3. Gasket 2 is shown merely for purposes of illustration and is not part of the present invention. Clip 1 includes a metal core 4 that has been formed into a U-shape in cross section transverse to the length of the core and clip 1. One of the legs of the U-shape of core 4 is substantially longer than the other, although different clips may have legs substantially the same length. Core 4 is covered on all sides with a plastic material 5 that is flexible and has some elasticity. Cover 5, with metal core 4, forms within the U-shape a recess 6 for receiving a flange extending from another object. Plastic covering 5 includes a pair of longitudinal barbs 7 within volume 6. Longitudinal barbs 7 are oriented so that a flange of another object may be easily inserted into volume 6. However, longitudinal barbs 7 resist withdrawal of a flange that has been inserted into volume 6. As shown, flange 3 of gasket 2 also includes longitudinal projections that provide some resistance to withdrawal of a flange inserted within volume 6. Cover 5, including barbs 7, is applied to core 4 by conventional processes such as extrusion of a plastic on the core.

Clip 1 is an example of a known clip. Examples of such known clips are shown in U.S. Pat. No. 3,256,577, West German Patent No. 23 02 877 and published West German Application No. 82 34 842. The metal core used in these clips determines the form of, and the ability of, the clips to conform to a curve along a flange.

Figure 2:
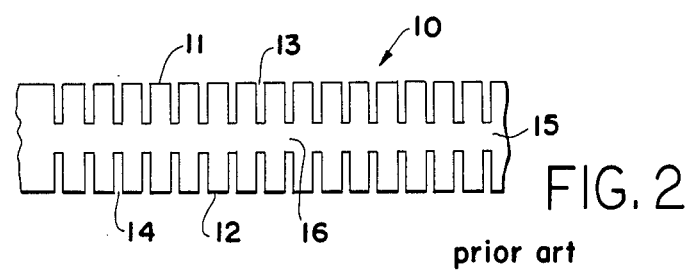
FIG. 2 is a plan view of a prior art metal core.

An example of a known core 10 taken from FIG. 14 of West German Patent No. 23 02 877 is shown in plan view in FIG. 2. Core 10 is made from a ribbon of metal having opposed, generally parallel lengthwise edges 11 and 12. Along edge 11, a plurality of equally spaced slots 13 have been cut or punched into core 10. Slots 13 extend transversely to the length of core 10 from openings at edge 11 toward a central part of core 10. Likewise, a plurality of equally spaced slots 14 are cut into core 10 along edge 12. Slots 14 are transverse to the length of core 10 and extend from the outside edge 12 toward the central part of core 10. Between the innermost parts of slots 13 and 14, a continuous lengthwise carrier 15 provides support to prongs 16 defined by adjacent pairs of slots 13 and 14. An important feature of core 10 is the transverse alignment of slots 13 and 14. That is, each of slots 13 has a slot 14 lying directly opposite it. As a result of this arrangement, a transverse bridge 17, which is part of carrier 15, lies directly between each pair of slots 13 and 14.

Core 10 is made by punching out slots 13 and 14 or by slitting the ribbon and applying a force to carrier 15 as part of or after the slitting process that lengthens the ribbon to open the slits. Core 10 is covered with a plastic to complete a conventional clip. With the thickness of core 10 required to give that clip adequate strength and gripping ability, that clip cannot be lengthened by applying tensile forces. Even if that clip could be lengthened, because of the transverse orientation of the bridges 17 between slots 13 and 14 along carrier 15, any stretching would take place along carrier 15 as if the prongs did not exist. That is, carrier 15 amounts to a separate ribbon or wire that may be stretched without significant interaction of prongs 16 in the stretching.

Figure 3:
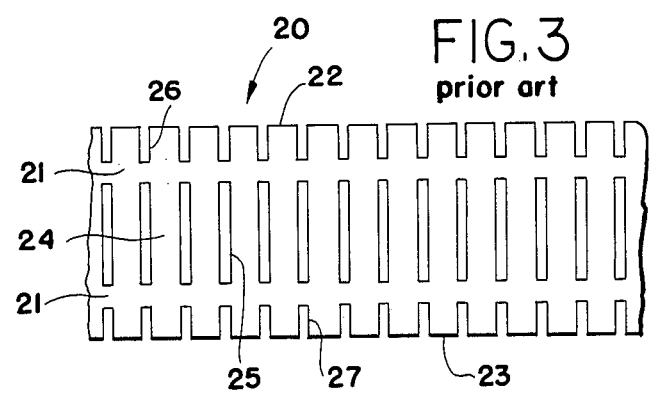
FIG. 3 is a plan view of a prior art metal core.

In FIG. 3, another known core 20 is shown in plan view. Core 20 includes two similar carriers 21 disposed near the opposed longitudinal outside edges 22 and 23 of a metal ribbon 24. Ribbon 24 includes a plurality of transverse, preferably equally spaced, slots 25 disposed between carriers 21 along the length of ribbon 24. Additional slots 26 and 27 are disposed outside carriers 21 and extend from the carriers to edges 22 and 23, respectively. Preferably, one of slots 26 and one of slots 27 is aligned, longitudinally, with each slot 25. The slots are prepared by slitting a metal ribbon and applying forces to the ribbon during or after the slitting process to extend the ribbon lengthwise and open the slits into slots.

A clip may be formed from core 20 by covering it with a plastic material. Thereafter, the clip is repeatedly flexed so that each carrier 21 is fractured along each of the aligned slots 25, 26 and 27. As a result of the fracture, the clip includes a covering encasing a large number of "free floating" transverse metal strips. Unlike the clip incorporating core 10, a clip incorporating a core 20 that has been fractured can be stretched since the metal core does not resist the tensile forces. However, the fractured metal strips also provide no resistance to the restorative compressive forces exerted by the plastic covering. That is, while a clip incorporating a core 20 may be stretched, it will not remain stretched, but will eventually return to its original length.

Figure 4:
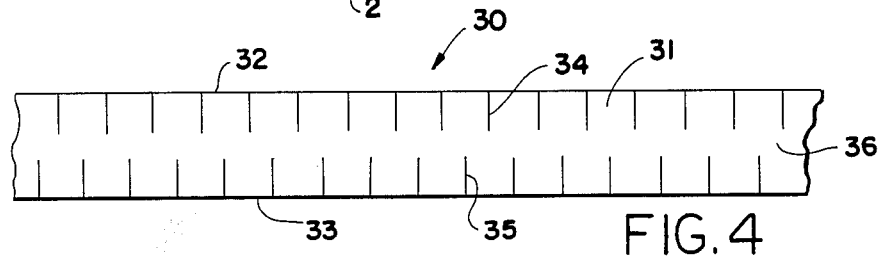
FIG. 4 is a plan view of a metal core according to the invention.
Figure 5:
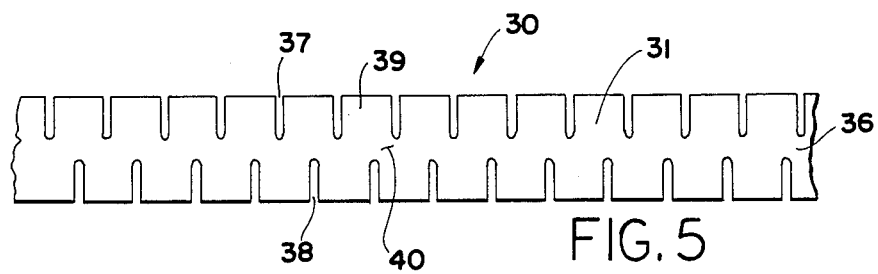
FIG. 5 is a plan view of the metal core of FIG. 4 after opening of the slits.

Turning now to FIGS. 4 and 5, a plan view of an embodiment of a clip core 30 according to the invention is shown. Like elements in the two drawings are given the same reference numbers. These drawings illustrate the principles of the invention, but are not drawn to any scale. In FIG. 3, a length of a ribbon 31, preferably a metal such as carbon steel, a mild steel or aluminum, is shown. Ribbon 31 has opposed, generally parallel lengthwise edges 32 and 33. A plurality of generally transverse slits 34 has been cut into ribbon 31 from edge 32. Likewise, a second plurality of slits 35 has been cut into ribbon 31 extending from edge 33 towards the central portion of ribbon 31. The slits may be cut by conventional metal working machinery. The slits define a generally lengthwise carrier 36 centrally disposed on ribbon 31. Preferably, each of slits 34 and 35 are equidistantly spaced from its nearest neighboring slits along the same edge of ribbon 31. Most preferably, the lengthwise spacing between each of slits 34 and each of slits 35 is the same.

It is an important feature of the invention that slits 34 and slits 35 are longitudinally offset with respect to each other. That is, unlike cores 10 and 20 in which each transverse slot is directly longitudinally aligned with another transverse slot, in novel core 30, each transverse slit 34 is at a different longitudinal position, i.e., along the length of ribbon 31 from the positions of transverse slits 35. As a result of this structure, no transverse bridges between prongs on opposite sides of the ribbons are established.

In FIG. 5, core 30 has been lengthened to open slits 34 and 35 into slots 37 and 38, respectively. The lengthening may result from forces applied to ribbon 31 during or after the slit cutting process. Between each adjacent pair of slots lies a prong 39. Each prong 39 adjoins carrier 36. Opposite each prong 39 on one side of carrier 36 is another slot and portions of two other prongs. This arrangement establishes bridges 40 between slots 37 and 38 that are oblique, i.e., not transverse with respect to the length of ribbon 31. Because of the orientation of bridges 40, when core 30 is incorporated in a clip, the clip may be stretched. Prongs 39 interact in the stretching of the clip and prevent subsequent clip shrinkage.

Figures 6A, 6B:
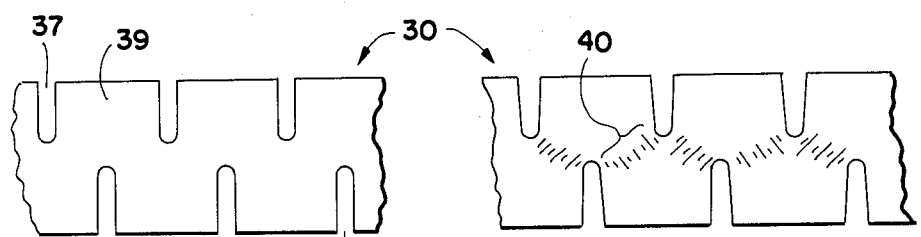
FIG. 6A and 6B detailed views of a portion of a metal core according to the invention illustrating lengthening of the core.

The complex interaction between prongs 39 and carrier 36 that permits lengthening of a clip incorporating core 30 is illustrated in FIGS. 6A and 6B. FIG. 6A shows a detailed view of a portion of carrier 36, prongs 39 and oblique bridges 40 of ribbon 31 before applying any tensile force. For clarity, the spacing of slots 37 and 38 has been altered from that of FIGS. 4 and 5. As FIG. 6A makes clear, the shortest length of metal between free edges of ribbon 31 lies along bridges 40. Therefore, when longitudinal tensile forces are applied to ribbon 31, bridges 40 yield first.

In FIG. 6B, the detail of FIG. 6A is shown, but after application of a longitudinal tensile force that results in yielding of ribbon 31. As a result of the yielding, the shape of the slots is distorted as are the lengths of at least some of bridges 40. In this yielding, the metal along bridges 40 is cold worked, i.e., the elastic limit is exceeded, as indicated by the shading, resulting in permanent changes in dimension. Because of the complementary obliqueness of adjacent bridges 40, the yielding produces a permanent net increase in the length of ribbon 31. Thus, a clip incorporating core 30 may be slightly lengthened by applying tensile forces. Because of the cold working of the metal ribbon along the bridges, any compressive restorative forces exerted by the plastic covering of the clip as a result of the stretching are ineffective in restoring the clip to its original length. Yet the stretching does not adversely affect the flexibility that permits a clip to conform to relatively small radius curves in the flanges to which the clip is applied.

Although in FIGS. 4 and 5 slots 37 and 38 are all shown equally spaced from their nearest neighbors and disposed between the two nearest slots on the opposite side of the ribbon, that precise spacing is not essential to the invention. In addition, while carrier 36 is shown located in the center of ribbon 31, carrier 36 may be offset from the geometrical center of the ribbon. In any case, carrier 36 is disposed centrally, i.e., spaced from edges 32 and 33 of ribbon 31, but need not be precisely centered between those edges in some applications. An example of a clip employing an embodiment of a core according to the invention, and in which the central carrier is substantially offset the geometrical center of the ribbon, is shown in FIG. 7.

While slots 37 and 38 are shown in FIGS. 4 and 5 as having no overlap, i.e., as not extending across carrier 36, the invention is not so limited. That is, slots 37 and/or 38 may extend far enough, transversely, so that they are interdigitated. In that case, carrier 36 is not purely longitudinal, but has a serpentine configuration along the length of ribbon 31. In this embodiment of the invention, the oblique, i.e., nontransverse, disposition of bridges 40 is not altered.

The length and width of the slots and their spacing may be determined for a particular application by one of skill in the art. Desired slot length depends upon, among other factors, the thickness and width of ribbon 31 (which in turn affects the flexibility of a clip incorporating the core) and the clip configuration (e.g., relative length of clip legs).

Figure 7:
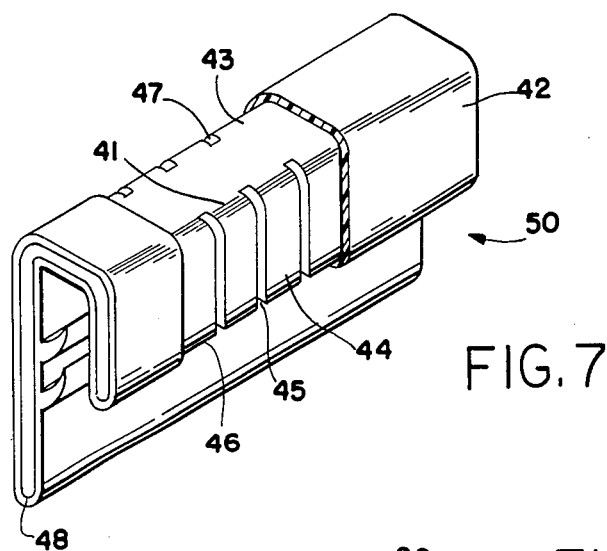
FIG. 7 is an embodiment of a clip according to the invention shown partially in section.

In FIG. 7, an embodiment of a clip 50 according to the invention is shown, partially in section, so that its core 41 can be seen. Core 41 is covered with a plastic covering 42. In order to form clip 50, covered core 41 is normally bent along one or more axes disposed generally parallel to edges 32 and 33. Core 41 and clip 50 have a U-shape in which one of the legs is substantially longer than the other. Core 41 includes a longitudinal carrier 43 disposed within the clip in the bridging portion adjoining the two legs of the U-shape. Prongs 44 extend from one side of carrier 43 and are defined by slots 45 extending to an outside edge 46 of core 41. Longer prongs that are not visible in FIG. 7 extend from the opposite side of carrier 43 and are defined by slots 47 that extend to edge 48 of core 41.

As is apparent from FIG. 7, clip 50 may be conformed to a relatively small radius flange by means of slots 45 and 47. That is, clip 50 can be bent around an axis generally perpendicular to prongs 44 to conform to curvature of a flange inserted within the clip. In addition, clip 50 can be extended by tensile forces applied along its length. Because of the nontransverse, oblique bridges between the prongs of core 41, core 41 will maintain a lengthwise extension that cold works the core along its oblique bridges in spite of compressive forces that may be applied by plastic covering 42.

The invention has been described with respect to certain preferred embodiments. Various additions and modifications within the spirit of the invention will occur to those of skill in the art. Accordingly, the scope of the invention is limited solely by the following claims.

I claim:

1. A core for making an elongate, flexible clip having a plastic covering comprising:

a length of a flexible metal ribbon having two opposed, outside lengthwise edges, said ribbon containing a plurality of slots lying transverse to said length, each of said slots not extending into, a longitudinally continuous portion of said ribbon, the slots along one of said edges being longitudinally offset from the slots along the other of said edges, wherein said slots are formed by cutting slits in said ribbon and elongating said ribbon along said continuous portion to widen said slits into said slots.

2. The core of claim 1 wherein adjacent slots along each said edge of said ribbon are substantially equidistant from each other and the slots along one of said edges are offset from the slots along the other of said edges by substantially one half the distance between adjacent slots.

3. The core of claim 1 wherein said continuous, longitudinal portion is centrally disposed between said edges.

4. A core for making an elongate, flexible clip having a plastic covering comprising:

a length of a flexible metal ribbon having two opposed, outside lengthwise edges, said ribbon containing a plurality of slots lying transverse to said length, each of said slots extending from one or the other of said edges to, but not extending into, a longitudinally continuous portion of said ribbon, wherein said slots are formed by cutting slits in said ribbon and elongating said ribbon along said continuous portion to widen said slits into said slots, and wherein the shortest distance between the inner ends of two slots extending from opposite edges of said ribbon lies along a line that is neither transverse with respect to said length nor longitudinal.

5. The core of claim 4 wherein adjacent slots along each said edge of said ribbon are substantially equidistant from each other and the slots along one of said edges are offset from the slots along the other of said edges by substantially one half the distance between adjacent slots.

6. The core of claim 4 wherein said continuous, longitudinal portion is centrally disposed between said edges.

7. An elongate flexible clip for engaging a flange comprising:

an elongate, flexible metal ribbon core, said ribbon core having two opposed, outside lengthwise edges, a plurality of slots lying transverse to said length, each of said slots extending from one or the other of said edges to, but not extending into, a longitudinally continuous portion of said ribbon, the slots along one of said edges being longitudinally offset from the slots along the other of said edges, wherein said slots are formed by cutting slits in said ribbon and elongating said ribbon along said continuous portion to widen said slits into said slots, at least part of said core being bent about at least one axis generally parallel to said length to form a clip for engaging a flange; and a flexible plastic material covering said core.

8. The clip of claim 7 wherein adjacent slots on each side of said carrier are substantially equidistant from each other and the slots along one of said edges are offset from the slots along the other of said edges by substantially one half the distance between adjacent slots.

9. The clip of claim 7 wherein said continuous, longitudinal portion is centrally disposed between said edges.

10. An elongate flexible clip for engaging a flange comprising:

an elongate, flexible metal ribbon core, said ribbon core having two opposed, outside lengthwise edges, a plurality of slots lying transverse to said length, each of said slots extending from one or the other of said edges to, but not extending into, a longitudinally continuous portion of said ribbon, wherein said slots are formed by cutting slits in said ribbon and elongating said ribbon along said continuous portion to widen said slits into said slots, and wherein the shortest distance between the inner ends of two slots extending from opposite edges of said ribbon lies a line that is neither transverse with respect to said length nor longitudinal, at least part of said core being bent about at least one axis generally parallel to said length to form a clip for engaging a flange; and a flexible plastic material covering said core.

11. The clip of claim 10 wherein adjacent slots on each side of said continuous, longitudinal portion are substantially equidistant from ech other and the slots along one of said edges are offset from the slots along the other of said edges by substantially one half the distance between adjacent slots.

12. The clip of claim 10 wherein said continuous, longitudinal portion is centrally disposed between said edges.

* * * * *